United States Patent
Nakano

(10) Patent No.: US 11,695,881 B2
(45) Date of Patent: Jul. 4, 2023

(54) IMAGE FORMING APPARATUS THAT CREATES A COMPOSITE IMAGE BY COMPARING IMAGE DATA OF DOCUMENT SHEETS, CONTROL METHOD THEREOF, AND STORAGE MEDIUM

(71) Applicant: CANON KABUSHIKI KAISHA, Tokyo (JP)

(72) Inventor: Kyosuke Nakano, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/709,597

(22) Filed: Mar. 31, 2022

(65) Prior Publication Data
US 2022/0321707 A1    Oct. 6, 2022

(30) Foreign Application Priority Data
Apr. 5, 2021   (JP) ................. 2021-064276

(51) Int. Cl.
*H04N 1/00* (2006.01)
*H04N 1/387* (2006.01)

(52) U.S. Cl.
CPC ..... *H04N 1/00047* (2013.01); *H04N 1/00074* (2013.01); *H04N 1/00442* (2013.01); *H04N 1/00824* (2013.01); *H04N 1/387* (2013.01)

(58) Field of Classification Search
None
See application file for complete search history.

(56) References Cited

U.S. PATENT DOCUMENTS

| | | | | |
|---|---|---|---|---|
| 5,257,074 A * | 10/1993 | Kamei | ............. | G03G 15/04018 358/1.11 |
| 8,248,651 B2 * | 8/2012 | Fukuda | ................. | H04N 1/387 358/448 |
| 8,363,260 B2 * | 1/2013 | Kido | .................... | H04N 1/3871 358/1.9 |
| 8,854,322 B2 * | 10/2014 | Saito | ........................ | G06T 1/00 345/173 |
| 9,041,962 B2 * | 5/2015 | Maruyama | ............ | G06F 3/1208 358/1.15 |
| 9,204,009 B2 * | 12/2015 | Hanawa | ............. | H04N 1/00379 |
| 9,235,916 B2 * | 1/2016 | Tanaka | .................... | G06T 11/60 |
| 9,661,179 B2 * | 5/2017 | Yamada | ............. | G06V 30/2247 |
| 10,853,980 B2 * | 12/2020 | Koizumi | ............. | H04N 1/3871 |

(Continued)

FOREIGN PATENT DOCUMENTS

JP    2006109009 A  *  4/2006
JP    2007265007 A     10/2007
(Continued)

*Primary Examiner* — Scott A Rogers
(74) *Attorney, Agent, or Firm* — Rossi, Kimms & McDowell LLP

(57) ABSTRACT

An image forming apparatus comprises a reading unit that reads a document sheet, specifies image data of a comparison source document sheet, among image data of document sheets read by the reading unit; extracts a difference by comparing the image data of the specified comparison source document sheet, and image data of each of other document sheets included in the read document sheets; and creates a composite image by composing the extracted difference and the image data of the comparison source document sheet.

7 Claims, 7 Drawing Sheets

(56) References Cited

U.S. PATENT DOCUMENTS

| | | | | |
|---|---|---|---|---|
| 2005/0129324 A1* | 6/2005 | Lemke | ............... | H04N 5/23219 |
| | | | | 382/284 |
| 2005/0141035 A1* | 6/2005 | Buckley | ................ | G06F 40/174 |
| | | | | 358/448 |
| 2013/0124963 A1* | 5/2013 | Hatwich | ............... | G06F 40/169 |
| | | | | 715/230 |

FOREIGN PATENT DOCUMENTS

| | | | |
|---|---|---|---|
| JP | 2009055516 A | * | 3/2009 |
| JP | 2016143961 A | * | 8/2016 |
| JP | 2019046280 A | * | 3/2019 |

* cited by examiner

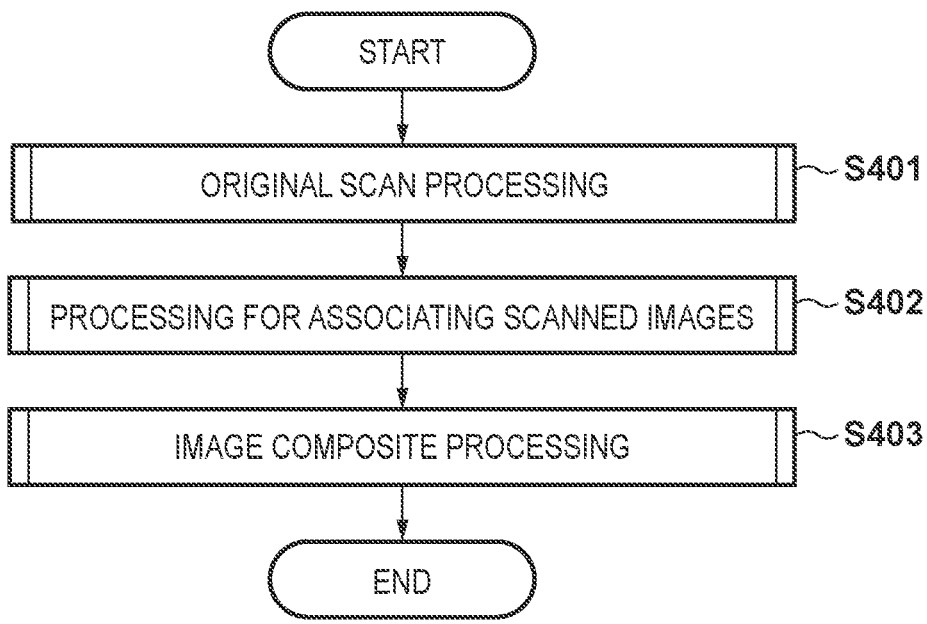
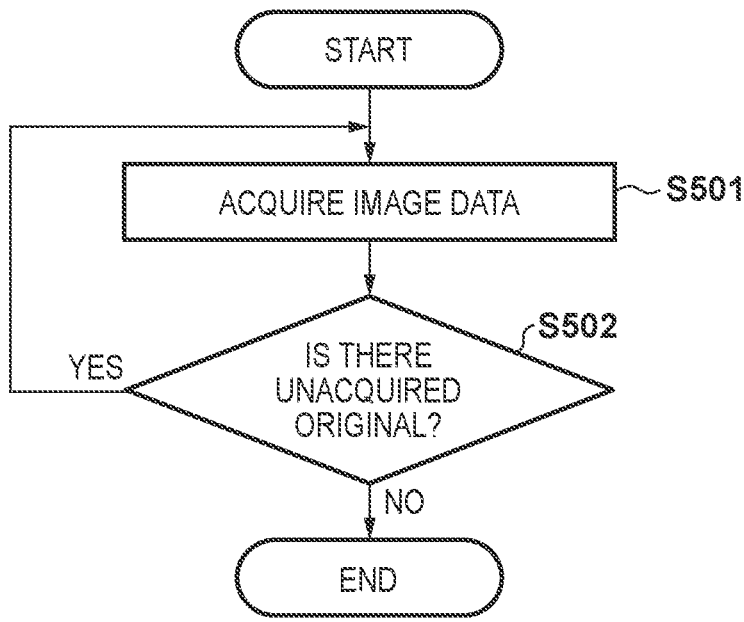

IMAGE FORMING APPARATUS THAT CREATES A COMPOSITE IMAGE BY COMPARING IMAGE DATA OF DOCUMENT SHEETS, CONTROL METHOD THEREOF, AND STORAGE MEDIUM

BACKGROUND OF THE INVENTION

Field of the Invention

The present invention relates to an image forming apparatus, a control method thereof, and a storage medium.

Description of the Related Art

Technology is known in which an original obtained by duplicating a specified original is distributed to a plurality of users to make the users each write in the original, and an original including a written portion by the user is read by an image forming apparatus including a reading function, and thus the written portion that corresponds to a difference from the specified original is reflected in image data of the specified original. For instance, Japanese Patent Laid-Open No. 2007-265007, proposes that image data and an original that have identification information are used to extract the identification information from the image data of the original read by an image forming apparatus, and a difference from image data having identification information that matches the identification information, and the image data are composed.

However, the conventional technology described above has a problem described below. In the conventional technology described above, in control of extracting and composing a differences between one original and each of a plurality of originals, identification information is used for association between images. Thus, as for an original having no identification information, extraction and composite of a difference between images cannot be performed. That is, in the conventional technology described above, image data read by the image forming apparatus can be associated with other image data, based upon the identification information, but image data obtained by reading an original having no identification information cannot be associated with corresponding other image data.

SUMMARY OF THE INVENTION

The present invention enables realization of a mechanism of suitably associating image data read from even an original having no identification information with corresponding other image data, and as another purpose, realization of composite of a difference between associated pieces of image data.

One aspect of the present invention provides an image forming apparatus comprising: a reading unit that reads a document sheet; at least one memory device that stores a set of instructions; and at least one processor that executes the set of instructions to: specify image data of a comparison source document sheet, among image data of document sheets read by the reading unit; extract a difference by comparing the image data of the specified comparison source document sheet and image data of each of other documents sheets included in the read document sheets; and create a composite image by composing the extracted difference and the image data of the comparison source document sheet.

Another aspect of the present invention provides a method of controlling an image forming apparatus comprising a reading unit that reads a document sheet, the method comprising: specifying image data of a comparison source document sheet, among image data of document sheets read by the reading unit; extracting a difference by comparing the image data of the specified comparison source document sheet, and image data of each of other document sheets included in the read document sheets; and creating a composite image by composing the extracted difference and the image data of the comparison source document sheet.

Still another aspect of the present invention provides a non-transitory computer-readable storage medium storing a computer program causing a computer to execute processing in a method of controlling an image forming apparatus comprising a reading unit that reads a document sheet, the control method comprising: specifying image data of a comparison source document sheet, among image data of document sheets included in document sheets read by the reading unit; extracting a difference by comparing the image data of the specified comparison source document sheet, and image data of each of other document sheets included in the read document sheets; and creating a composite image by composing the extracted difference and the image data of the comparison source document sheet.

Further features of the present invention will be apparent from the following description of exemplary embodiments with reference to the attached drawings.

BRIEF DESCRIPTION OF THE DRAWINGS

FIG. 4 is a flowchart for illustrating entire processing of an application, according to an embodiment.

FIG. 5 is a flowchart for illustrating reading processing of an application, according to an embodiment.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached draw-

First Embodiment

A first embodiment of the present invention will be explained below. A difference among the first embodiment, a second embodiment, and a third embodiments will be explained with reference to FIGS. 3 and 6 below, and explanation for other aspects is common among the respective embodiments. In addition, common configurations and control will be explained in the first embodiment, and the explanation for the common configurations and control will be omitted in other embodiments.

Configuration of Image Forming Apparatus

Figure 1:
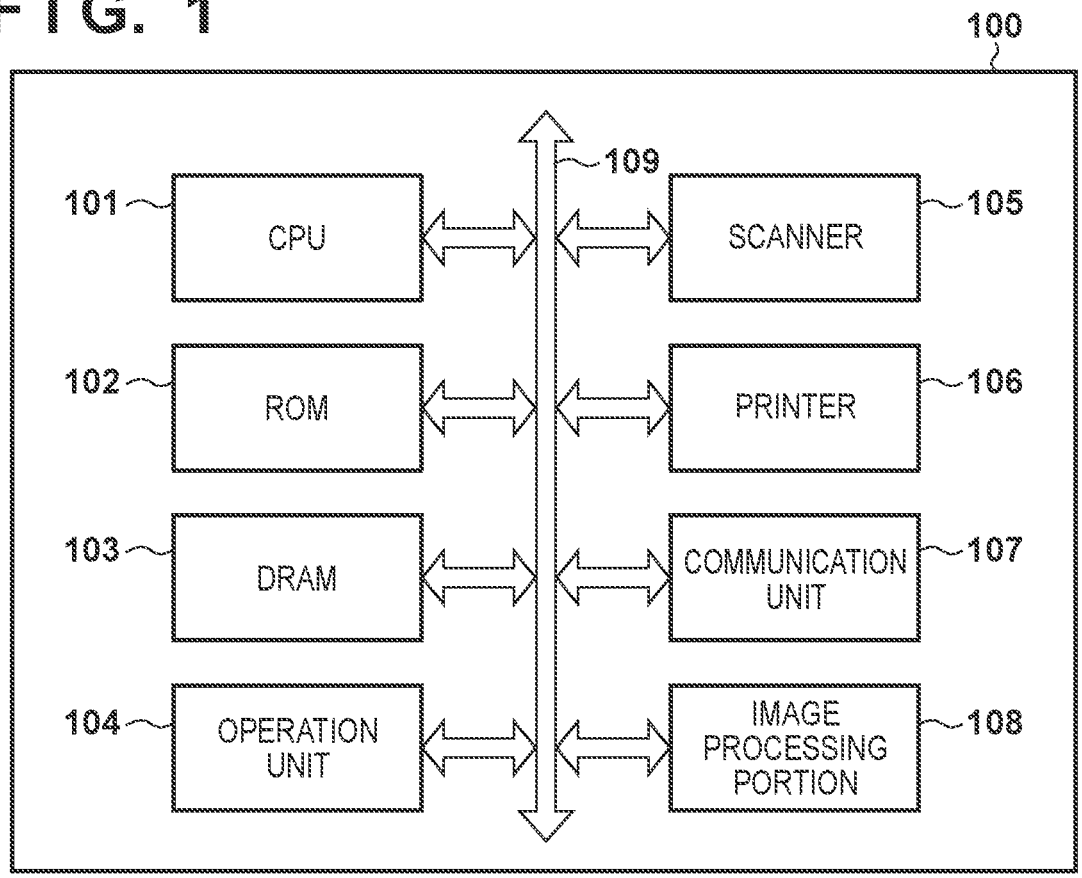
FIG. 1 is a figure illustrating an example of a system configuration of an image forming apparatus according to an embodiment.

First, a configuration example of an image forming apparatus will be explained with reference to FIG. 1. Here, the image forming apparatus will be explained by taking a multi-functional apparatus 100 as an example. Note that the present invention is not intended to be limited and that the present invention can be applied to any image forming apparatus including a reading function to read an original (a document sheet).

The multi-functional apparatus 100 includes, as a main hardware configuration, a CPU 101, a ROM 102, a DRAM 103, an operation unit 104, a scanner 105, a printer 106, a communication unit 107, and an image processing unit 108. The CPU 101 is a control unit of the system, and controls the apparatus entirely. In addition, the CPU 101 reads and executes a control program stored in the ROM 102. The ROM 102 includes a flash memory such as an eMMC, and stores the control program of the CPU 101. The ROM 102 also stores a setting value, image data, and the like that cannot be lost at power OFF. The DRAM 103 stores a program control variable and the like, and is a volatile memory in which image data and the like to be processed can be saved temporarily.

The operation unit 104 is an interface unit with a user that displays information in a device. The scanner 105 is an apparatus that reads image data and converts image data into binary data, and is used to perform original reading of an image transmission function. The printer 106 is an apparatus that performs fixing temperature adjustment control to fix and output image data on a sheet such as printing paper. The communication unit 107 is an interface unit between a device and an external communication network, and includes a network communication unit that is an interface to a network. The image processing unit 108 includes an ASIC that performs image processing such as resolution conversion, compression-expansion, and rotation on input and output image data. The respective control units can transmit and receive data to and from one another via a data bus 109.

Home Screen

Next, with reference to FIG. 2, an example of a home screen 200 displayed on the operation unit 104, according to the present embodiment will be explained. The home screen 200 is mainly displayed on the operation unit 104 immediately after activation of the multi-functional apparatus 100, and a user taps an icon displayed on the home screen 200, and thus a screen registered with the icon can be displayed. Further, on the screen displayed, various settings and the like can be performed, and accordingly, various functions incorporated in the multi-functional apparatus 100 can be executed.

A function proposed in the present invention is incorporated in an application (may be abbreviated to app, below) 201 having a scanning function and a composite function of an image. The application 201 is selected to cause transition to a setting screen of the function, and various settings can be performed, and reading of a plurality of originals (also referred to as a batch of originals) that are placed in the multi-functional apparatus 100 and that correspond to reading targets can start. Accordingly, in accordance with setting contents, the multi-functional apparatus 100 reads, by the scanner 105, the plurality of originals placed, and extracts a difference in each original read to generate a composite image. Note that the multi-functional apparatus 100 may form, on a sheet by the printer 106, the composite image generated, or may transmit corresponding image data to an external apparatus by the communication unit 107. In addition, the multi-functional apparatus 100 may perform thumbnail display on the operation unit 104 of the composite image generated, and a user may check the composite image. In that case, the multi-functional apparatus 100 may perform thumbnail display of the composite image in addition to a plurality of read images. Accordingly, a user can check easily whether a difference is composed.

Screen Transition

Figure 3A:
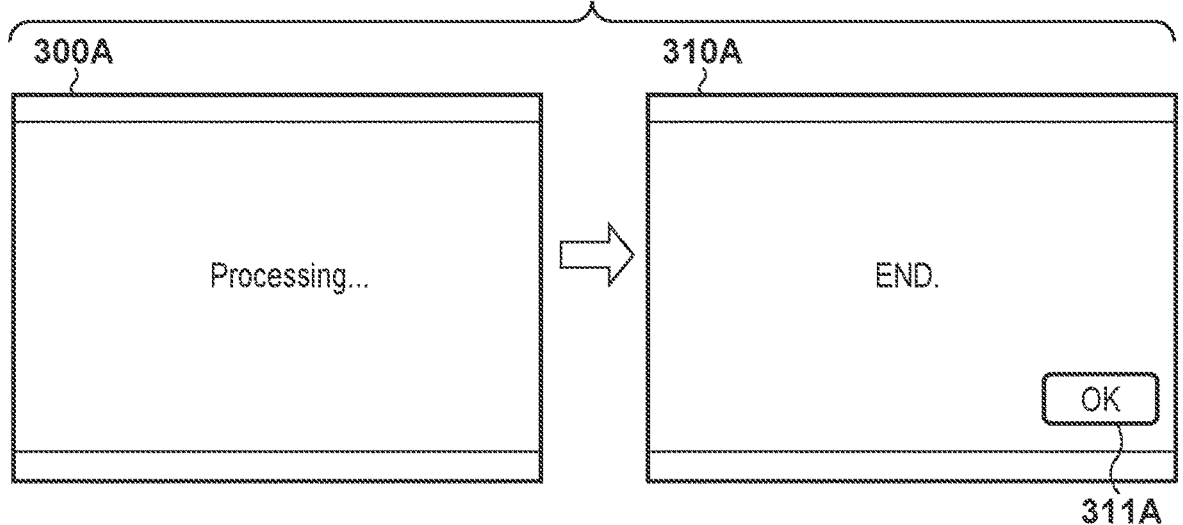
FIGS. 3A and 3B are figures each illustrating an example of a screen displayed when an application operates, according to an embodiment.
Figure 3B:
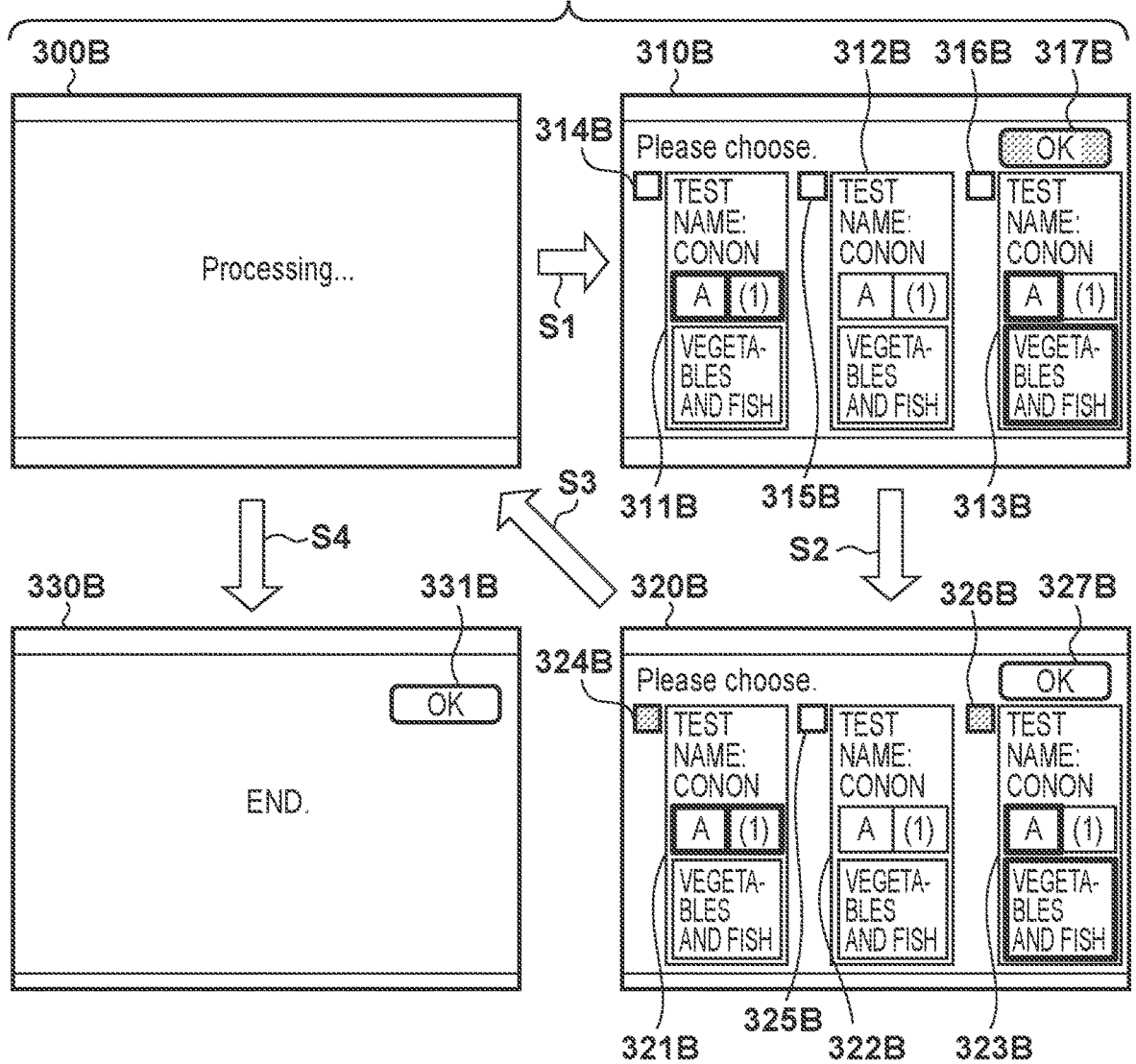

Next, FIG. 3 is a figure illustrating screen transition performed when processing of the application 201 having a scanning function and a composite function of an image is executed. Here, the screen transition according to the present embodiment will be explained with reference to FIG. 3A as an example. In addition, FIG. 3A is a figure corresponding to the third embodiment described below. With reference to FIG. 3B, the second embodiment will be explained below.

First, when the application 201 is selected by a user from the home screen 200, the home screen 200 transits to a screen 300A illustrated in FIG. 3A, and processing at S401 illustrated in FIG. 4 described below starts. The screen 300A is a screen indicating that the processing of the application 201 is in progress.

Subsequently, when the processing of the application 201 is completed, the screen 300A transits to a screen 310A. The screen 310A indicates that the processing of the application 201 is completed. On the screen 310A, there is an icon 311A (OK button) for screen transition, and in a case where the icon 311A is selected, the screen 310A transits to the home screen 200.

Processing Procedure

Next, with reference to FIG. 4, a processing procedure of reading a plurality of images and composing a difference, according to the present embodiment will be explained. A flowchart illustrates the entire processing of the application 201 having a scanning function and a composite function of an image. Processing explained below is implemented, for instance, by the CPU 101 that reads, into the DRAM 103, a control program stored in advance in the memory such as the ROM 102, and that executes the control program. The application 201 is selected by a user from the home screen 200 of the operation unit 104, and thus the application 201 starts the processing. The processing of the application 201 includes three types of processing explained below, that is, original scan processing, scanned image association processing, and image composite processing.

First, at S401, the CPU 101 invokes a function for executing the original scan processing. In the original scan processing, scan by the scanner 105 is implemented with respect to a plurality of originals placed by a user in the multi-functional apparatus 100, and image data of all the plurality of originals is acquired. Note that the processing of S401 will be described below in detail with reference to FIG. 5.

Next, at S402, the CPU 101 invokes a function for executing the association processing of scanned images. The association processing of scanned images includes assigning an attribute to each piece of the image data acquired by the original scan processing described above. Here, the attribute to be assigned to the image data includes two types of attributes, that is, an attribute indicating that the image data corresponds to a comparison source image used when pieces of image data are compared with one another (hereinafter referred to as a comparison source attribute), and an attribute indicating that the image data corresponds to an image targeted for comparison with a comparison source image (hereinafter referred to as a comparison target attribute). Note that the comparison source attribute is assigned to only one sheet of image data among image data acquired, and the comparison target attribute is assigned to all pieces of image data other than the image data assigned the comparison source attribute. That is, at S402, the processing is processing of specifying a comparison source image among scanned images. The processing at S402 will be described below in detail with reference to FIG. 6.

Finally, at S403, the CPU 101 invokes a function for executing the composite processing of images. The composite processing of images includes referencing to the attribute of the image data having the attribute assigned, comparing an image having the comparison source attribute (hereinafter referred to as a comparison source image) with each image having the comparison target attribute (hereinafter referred to as a comparison target image), and extracting a difference between the respective images. Further, the difference between the respective images that is extracted (hereinafter referred to as a difference image) and a copy of the comparison source image (hereinafter referred to as a composite base image) are composed, and an image (hereinafter, referred to as a resulting composite image) is generated. Note that the processing at S403 will be described below in detail with reference to FIG. 7.

In addition, output of the resulting composite image can be performed by various methods such as printing by the printer 106 and transmission to an external apparatus by the communication unit 107. As described above, before the output, thumbnail display on the operation unit 104 of the multi-functional apparatus 100 may be performed, and a user may check the resulting composite image.

Original Scan Processing

Next, the processing procedure of the original scan processing (S401) explained with reference to FIG. 4 will be explained in detail with reference to FIG. 5. In the processing, originals placed are read by the scanner 105, and conversion to image data is performed on all originals included in a batch of originals. The processing explained below is implemented, for instance, by the CPU 101 that reads, into the DRAM 103, a control program stored in advance in the memory such as the ROM 102, and that executes the control program.

At S501, the CPU 101 acquires image data from the scanner 105, and stores the image data in the DRAM 103. Note that the image data stored here is stored in association with a batch of originals read. That is, a plurality of pieces of image data read from a plurality of originals included in one batch of originals are stored in association with one another. In addition, these pieces of image data stored each include information indicating a page number of an original from which the image data has been read. Subsequently, at S502, the CPU 101 determines whether there is an original from which no image data has been acquired. In a case where the scanner 105 detects an original from which no image data has been acquired, the processing returns to S501, and in a case where the scanner 105 does not detect such an original, the processing ends.

Association Processing of Scanned Images

Figure 6A:
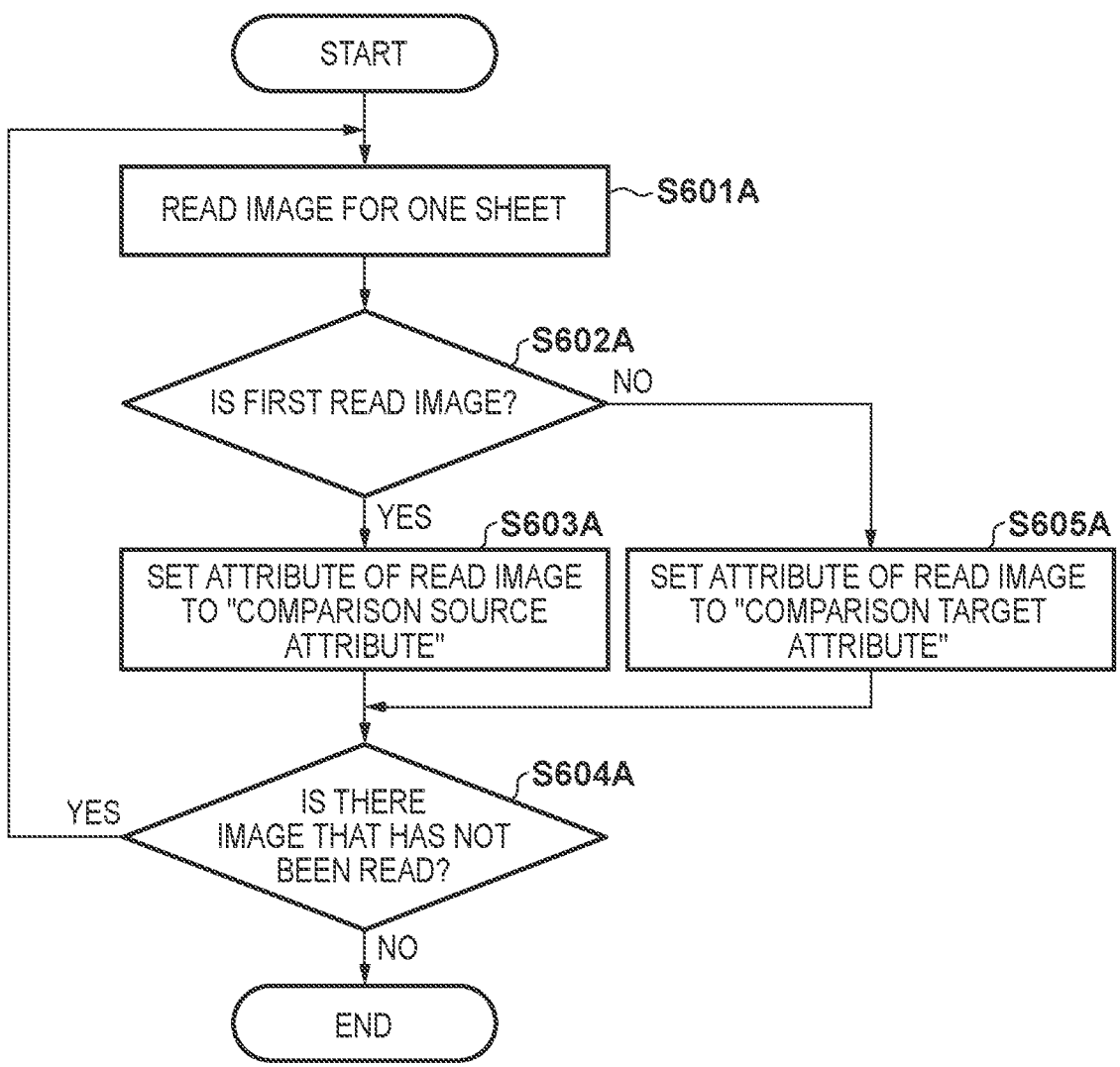
FIG. 6A is a flowchart for illustrating processing of assigning an attribute to a read image, according to an embodiment.

Next, with reference to FIG. 6, the processing procedure of the scanned image association processing (S402) explained with reference to FIG. 4 will be explained in detail. The processing includes assigning one of the comparison source attribute and the comparison target attribute to each piece of the image data of the originals scanned, and determining a role of each piece of the image data in the image composite processing described below with reference to FIG. 7. In addition, there are three methods of associating a scanned image, and in the present embodiment, a first method will be explained with reference to FIG. 6A, and the other methods will be explained with reference to FIG. 6B in the second embodiment, and with reference to FIG. 6C in the third embodiment, respectively. The method explained with reference to FIG. 6A is a method including assigning the comparison source attribute to a first scanned image, and assigning the comparison target attribute to each of scanned images other than the first scanned image. That is, a user uses a first original included in a batch of originals as an original corresponding to a comparison source image, and sets the batch of originals in the multi-functional apparatus 100, and causes the scanner 105 to read the batch of originals. The processing explained below is implemented, for instance, by the CPU 101 that reads, into the DRAM 103, a control program stored in advance in the memory such as the ROM 102, and that executes the control program.

At S601A, the CPU 101 reads image data of one sheet of original from the DRAM 103. Subsequently, at S602A, the CPU 101 determines whether the image data read at S601A is first image data, and in a case where the image data is the first image data, the processing proceeds to S603A, and in a case where the image data is not the first image data, the processing proceeds to S605A.

At S603A, the CPU 101 assigns the comparison source attribute to the first image data, and stores the image data in the DRAM 103. That is, the comparison source attribute is assigned to image data of the first original, and indicates that the image data corresponds to an original image of the original. On the other hand, at S605A, the CPU 101 assigns the comparison target attribute to image data other than the first image data, and stores the other image data in the DRAM 103, and the processing proceeds to S604. That is, the comparison target attribute is assigned to image data of the originals other than the first original.

At S604A, the CPU 101 determines whether there is an image that has not been read from the DRAM 103, and in a case where there is an image that has not been read from the DRAM 103, the processing proceeds to S601A, and in a case where there is no such an image, the processing ends. In this way, in the scanned image association processing, the comparison source attribute is assigned to one piece of image data, and a comparison source image is specified, and the processing can be said to be processing of specifying image data that corresponds to a comparison source image, among a plurality of pieces of image data read from a batch of originals.

Composite Processing of Images

Figure 7:
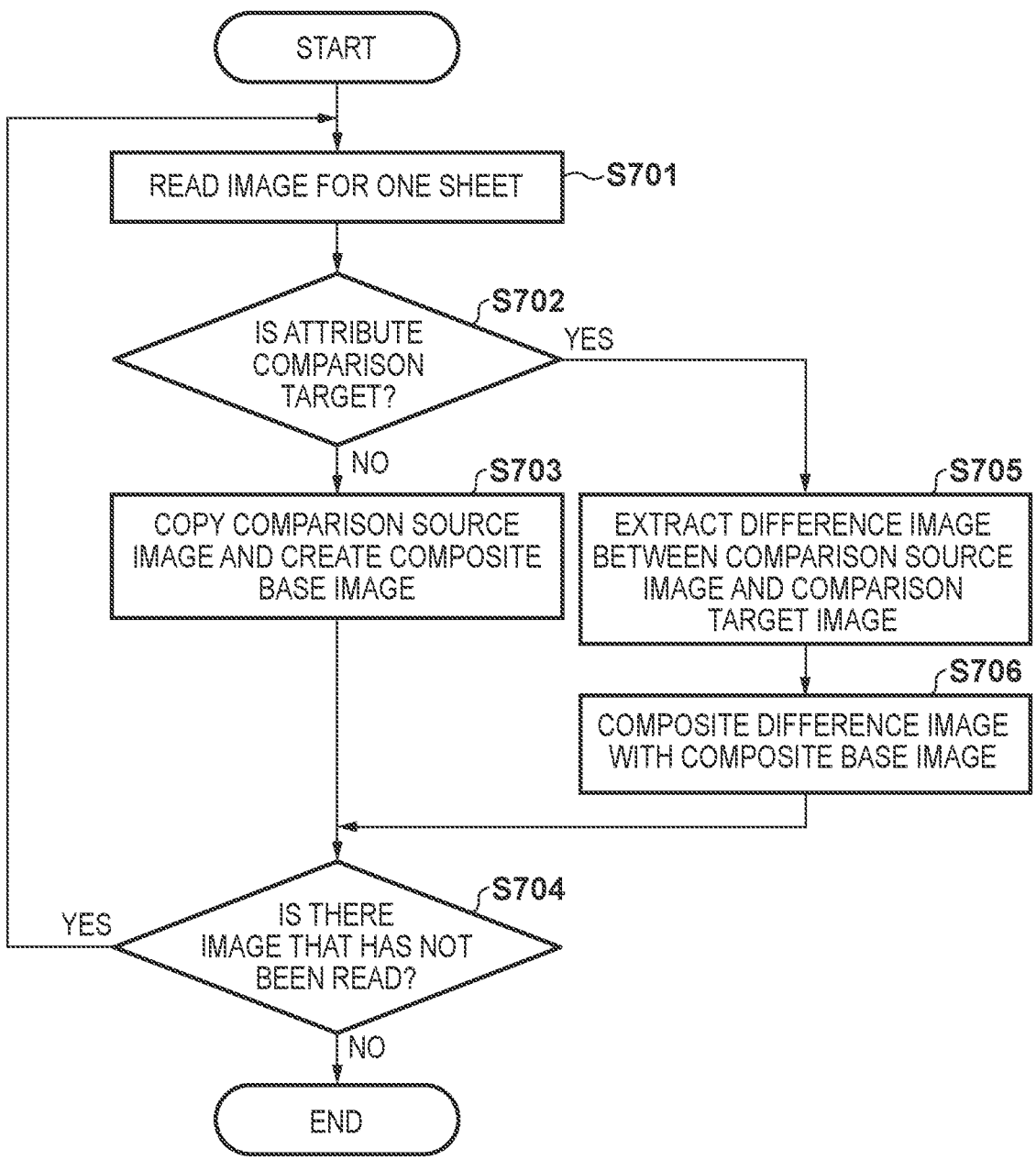
FIG. 7 is a flowchart for illustrating processing of composing an image of an application, according to an embodiment.

Next, with reference to FIG. 7, the processing procedure of the image composite processing (S403) explained with reference to FIG. 4 will be explained in detail. The processing includes referencing to the attribute of each piece of image data acquired, and in a case where the attribute of the image data is the comparison source attribute, copying the image data to generate a composite base image. On the other hand, in a case where the attribute of the image data is the comparison target attribute, a difference from the comparison source image is extracted, and each difference image acquired and the composite base image are composed to generate a resulting composite image. The processing explained below is implemented, for instance, by the CPU 101 that reads, into the DRAM 103, a control program stored in advance in the memory such as the ROM 102, and that executes the control program.

At S701, the CPU 101 reads image data of one sheet of original from the DRAM 103. Note that the image data to be read is image data having the attribute assigned in the scanned image association processing (S402) of FIG. 6. Subsequently, at S702, the CPU 101 determines whether the attribute assigned to the image data acquired at S701 is the comparison target attribute, and in a case where the attribute is the comparison target attribute, the processing proceeds to S705, and in a case where the attribute is not the comparison target attribute, the processing proceeds to S703.

At S703, the CPU 101 copies a comparison source image, and create a composite base image. Subsequently, at S704, the CPU 101 determines whether there is an image that has not been read from the DRAM 103, and in a case where there is an image that has not been read from the DRAM 103, the processing returns to S701, and in a case where there is no such an image, the processing ends. Note that in a case where there is no image that has not been read from the DRAM 103, the CPU 101 treats the composite base image as a resulting composite image and uses the composite base image in output processing such as printing, saving, and transmission to the outside.

On the other hand, at S705, the CPU 101 determines that the image data targeted for processing corresponds to the image targeted for comparison, and acquires a difference image between the comparison source image and the comparison target image. Note that as a method of acquiring a difference between images, known technology such as subtracting both pieces of image data from each other per pixel and acquiring a difference is used. Subsequently, at S706, the CPU 101 composes the difference image acquired at S705 and the composite base image created at S703. As a method of composing images, known technology such as compositing images by adding differences of pixels acquired is used. In addition, the step is executed the number of times equal to the number of sheets of comparison target images each time the application 201 is executed, and each time the step is executed, a difference image and a composite base image are composed and update is performed.

As explained above, the image forming apparatus according to the present embodiment includes the scanner that reads an original, and the image forming apparatus specifies image data of a comparison source original, among image data of originals included in a batch of originals read by the scanner originals. More specifically, the image forming apparatus specifies image data of a comparison source original, based upon a reading order (an original first read or last read) of respective originals included in a batch of originals read by the scanner. In addition, the image forming apparatus extracts a difference by comparing the image data of the comparison source original specified, and image data of each of other originals included in the batch of originals read, and creates a composite image by composing the difference extracted and the image data of the comparison source original. Accordingly, image data read from even an original having no identification information can be associated suitably with corresponding other image data. In addition, a difference between associated pieces of image data can be composed. Further, according to the present invention, it is unnecessary to hold image data of a comparison source image in advance, and any of originals included in a batch of originals read can be handled as a comparison source image.

Second Embodiment

The second embodiment of the present invention will be explained below. The present embodiment differs from the first embodiment described above in contents explained below with reference to FIGS. 3B and 6B, and only the difference will be explained with reference to FIGS. 3B and 6B, and explanation for other aspects is equivalent to the explanation in the first embodiment, and thus will be omitted.

Screen Transition

First, with reference to FIG. 3B, screen transition according to the present embodiment will be explained. Step numbers having arrows illustrated in FIG. 3B indicate an order of the screen transition, and indicate that the screen transition is performed in an order of S1, S2, S3, and S4.

First, when an application 201 is selected by a user from a home screen 200, the home screen 200 transits to a screen 300B illustrated in FIG. 3B, and the scan processing (S401) illustrated in FIG. 4 starts. The screen 300B is a screen indicating that the processing of the application 201 is in progress. Subsequently, when the scan processing illustrated in FIG. 4 is completed, the screen 300B transits to a screen 310B at S1, and processing at S601B illustrated in FIG. 6B starts. In the processing at S601B, selection by a user of an image displayed on an operation unit 104 is received from the operation unit 104.

The screen 310B is a screen on which thumbnail display of a list of the images acquired by the scan processing is performed, and displays, on left sides of images 311B, 312B, and 313B as a plurality of selection images, check boxes 314B, 315B, and 316B indicating selection status of the images by a user, respectively. In a case where no image is selected, an icon 317B receiving a start instruction of the processing by a user is grayed out, and reception of the start instruction by a user is prevented. Note that, on the screen 310B, any of the images 311B, 312B, and 313B is not selected by a user, and in a case where any of the images 311B, 312B, and 313B is selected by a user, a check mark is placed in the corresponding check box. Further, selection of an image can be performed only with respect to one sheet of image, and when one sheet of image is selected, the check boxes of the other images are grayed out, and reception of selection of the other images is prevented, and the grayout of the icon 317B is canceled. In addition, when the check box in which the check mark is placed is selected, the check mark is removed and the grayout of the other check boxes are canceled, and the icon 317B is grayed out and selection of an image by a user is received again.

Figure 6B:
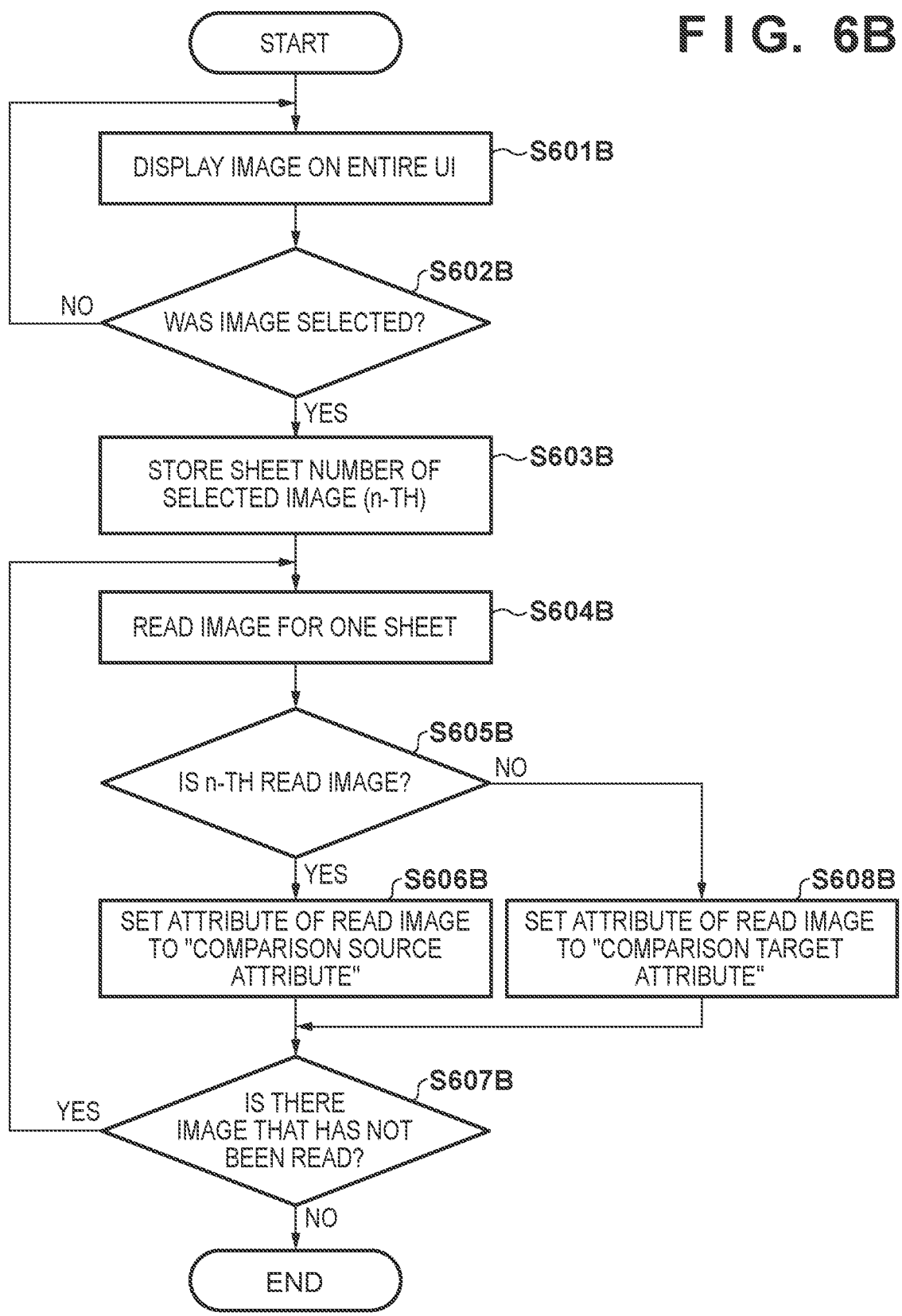
FIG. 6B is a flowchart for illustrating processing of assigning an attribute to a read image, according to an embodiment.

When the selection by a user is received, the screen 310B transits to a screen 320B at S2, and processing at S602B illustrated in FIG. 6B starts. In the processing at S602B, a start instruction of the processing by a user is received from the operation unit 104. The screen 320B indicates that selection status of an image by a user is updated. On the screen 320B, among images 321B, 322B, and 323B, the image 322B is selected, and a check mark is placed in a check box 325B. Further, the screen 320B displays other check boxes 324B and 326B that are grayed out, and an icon 327B in which grayout is canceled and which is to receive the start instruction of the processing by a user.

When the start instruction of the processing by a user is received, the screen 320B transits to the screen 300B at S3, and the scanned image association processing at S603B illustrated in FIG. 6B starts. As described above, the screen 300B is a screen indicating that the processing of the application 201 is in progress. When the processing of the application 201 is completed, the screen 300B transits to a screen 330B at S4. The screen 330B indicates that the processing of the application 201 is completed. On the screen 330B, there is an icon 331B for screen transition, and when the icon 331B is selected, the screen 330B transits to the home screen 200.

Scanned Image Association Processing

With reference to FIG. 6B, the scanned image association processing (S402) explained with reference to FIG. 4 will be explained in detail. The processing is a method including displaying, on the operation unit 104, the image acquired by the scan processing described above with reference to FIG. 5, receiving specification of a comparison source image by a user, and assigning a comparison source attribute to the image specified and assigning a comparison target attribute to other images. That is, unlike in the first embodiment described above, a user can start the processing of the application 201 without considering a reading order of originals read by a scanner 105, and during the processing, the user can specify a comparison source image from the operation unit 104, and thus can perform association between the images scanned. The processing explained below is implemented, for instance, by a CPU 101 that reads, into a DRAM 103, a control program stored in advance in a memory such as a ROM 102, and that executes the control program.

At S601B, the CPU 101 reads image data of all a plurality of originals from the DRAM 103, and displays a list of the image data on the operation unit 104. Note that this screen corresponds to the screen 310B, and thumbnail display is performed on this screen. Each piece of the image data read from the DRAM 103 includes information indicating a page number of an original from which the image data has been read. Subsequently, at S602B, the CPU 101 determines whether selection of image data by a user is executed on the operation unit 104, and in a case where the selection is executed, the processing proceeds to S603B, and in a case where the selection is not executed, the processing proceeds to S601B. Note that the case where it is determined in the processing at S602B that the selection is executed, for instance, the case where the icon 327B is selected in a state where the check mark is placed in the check box 325B by selection of the image on the screen 320B by a user. The image selected at S602B corresponds to a comparison source image at S606B described below.

At S603B, the CPU 101 stores, in the DRAM 103, the number n of sheets that indicates a page number of the image selected by a user. Subsequently, at S604B, the CPU 101 reads image data of one sheet of original from the DRAM 103. Further, at S605B, the CPU 101 reads a value of the n from the DRAM 103, and determines whether the image is an nth image, that is, whether the image is the image selected by a user. In a case where the image is the image selected by a user, the processing proceeds to S606B, and in a case where the image is not the image selected by a user, the processing proceeds to S608B. The processing from S606B to S608B is sequentially common to the processing from S603A to S605A of FIG. 6A, respectively, and thus explanation for the processing from S606B to S608B will be omitted.

As explained above, an image forming apparatus according to the present embodiment causes a display unit to selectively perform thumbnail display of a list of image data of respective originals read by a scanner, and specifies image data of an original selected by a user, as image data of a comparison source original. According to the present embodiment, unlike in the first embodiment described above, a user can start the processing of the application 201 without considering a reading order of originals read by the scanner 105. In addition, creation of a composite image desired by a user can further be ensured. Note that the present embodiment can be implemented in combination with other embodiments.

Third Embodiment

The third embodiment of the present invention will be explained below. The present embodiment differs from the first embodiment described above in contents explained with reference to FIG. 6C, and only the difference will be explained with reference to FIG. 6C, and explanation for other aspects is equivalent to the explanation in the first embodiment, and thus will be omitted.

Scanned Image Association Processing

Figure 6C:
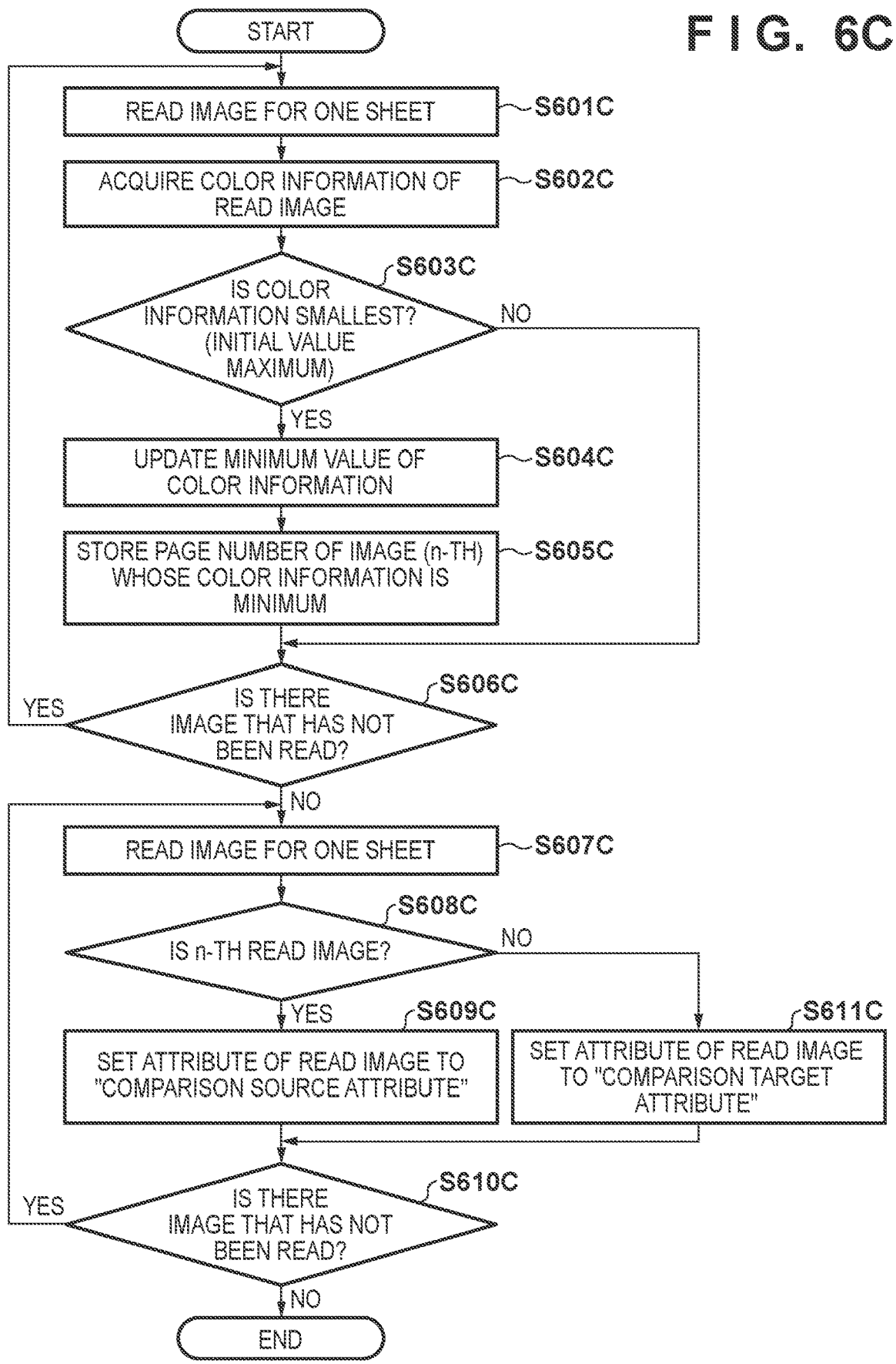
FIG. 6C is a flowchart for illustrating processing of assigning an attribute to a read image, according to an embodiment.

With reference to FIG. 6C, the scanned image association processing (S402) explained with reference to FIG. 4 will be explained in detail. The processing is a method including acquiring color information for each scanned image, assigning a comparison source attribute to an image having the smallest color information, and assigning a comparison target attribute to other images. The processing explained below is implemented, for instance, by a CPU 101 that reads, into a DRAM 103, a control program stored in advance in a memory such as a ROM 102, and that executes the control program.

At S601C, the CPU 101 reads image data of one sheet of original from the DRAM 103. Subsequently, at S602, the CPU 101 acquires color information of the image data read at S601C. Here, a known technique such as acquiring an RGB value of each pixel of image data, and the pixels are classified into several colors to obtain the number of colors that is used as color information is used.

Then, at S603C, the CPU 101 determines whether the color information acquired at S602C is equal to or less than a minimum value of current color information, and in a case where the color information is equal to or less than the minimum value of the current color information, the processing proceeds to S604C, and in a case where the color information is not equal to or less than the minimum value of the current color information, the processing proceeds to step S606C. Note that an initial value of the minimum value of the color information is assumed to be set to a maximum value that can be set. Subsequently, at S604C, the CPU 101 updates the minimum value of the color information to the value acquired at S602C. Further, at S605C, the CPU 101 stores, in the DRAM 103, a value n indicating a page number of the image currently having the smallest color information. Here, the case where pixels of image data are classified into several colors to obtain the number of colors that is used as the color information is assumed. Thus, in the present embodiment, the image having the minimum number of colors is set as a comparison source image. For instance, in image data having three colors constituted by writing a red color in image data having two colors of white and black, the image data having two colors and the minimum number of colors corresponds to a comparison source image.

Next, at S606C, the CPU 101 determines whether there is an image that has not been read from the DRAM 103, and in a case where there is an image that has not been read from the DRAM 103, the processing proceeds to S601C, and in a case where there is no such an image, the processing proceeds to S607C. Processing from S607C to S611C is similar to the processing from S604B to S608B of FIG. 6B in the second embodiment, and thus explanation for the processing from S607C to S611C will be omitted.

As explained above, an image forming apparatus according to the present embodiment specifies image data of a comparison source original, based upon color information of image data of respective originals read by a scanner. According to the present embodiment, unlike in the first embodiment described above, a user can start processing of an application 201 without considering a reading order of originals read by a scanner 105. In addition, unlike in the second embodiment described above, in the method of FIG. 6C, specification of a comparison source image on an operation unit 104 by a user is not performed, and an image read and having the smallest color information can be used as a comparison source image. That is, time and effort for selection by a user can be reduced. In addition, in the method of FIG. 6C, image data having minimum color information is identified and a comparison source image is determined. However, instead of this method, a method including acquiring an RGB value of each pixel of image data, and using, as a comparison source image, image data having the minimum number of pixels that exceed a specified RGB value (predetermined density value) may be used. Note that the present embodiment can be implemented in combination with other embodiments.

MODIFICATION EXAMPLE

The present invention is not limited to the embodiments described above, and various modifications can be made. In the embodiments described above, as the technique of specifying a comparison source image, various techniques such as specification by a reading order of originals, the selection of a read image by a user, and the color information of a read image are explained. However, these techniques are not intended to be limited to the configurations and control described above, and can be modified within the range of the technique in which even in a case where identification information is not included in an original, a comparison source image can be specified.

For instance, in the first embodiment described above, the example in which a batch of originals is collectively read and a first original is used as an original corresponding to a comparison source image is explained, but in the embodiment, it is necessary to ensure that a user sets an original corresponding to a comparison source image to be first read. That is, even in a case where a user intends to set an original corresponding to a comparison source image to be first read, the setting may be erroneous. To deal with such a case, for instance, first, an original corresponding to a comparison source image is requested from a user, and the one sheet of original placed in a multi-functional apparatus may be read and acquired as image data of a comparison source image. In this case, subsequently, one or more originals targeted for comparison (that is, originals other than the comparison source original) are requested from a user, and the one or more originals placed in the multi-functional apparatus are read to acquire image data of comparison target images. Accordingly, an erroneous operation by a user can be reduced, and a comparison source image can be specified more accurately. In addition, in the first embodiment, an original first read is specified as a comparison source image, but an original last read may be specified as a comparison source image.

In addition, in the second embodiment described above, the configuration in which a user selects a comparison source image is explained, but there may be made a configuration in which, after selection of a comparison source image, an image used for composite of a difference can be selected among a plurality of comparison source images. That is, in the second embodiment described above, the example in which a difference of each of all a plurality of comparison target images and a comparison source image are composed is explained, but a difference of each of only some of comparison target images and a comparison source image may be composed. Note that the selection of comparison target images is applicable to the first and third embodiments described above.

In addition, in the third embodiment described above, the technique of specifying a comparison source image, based upon color information (for instance, the number of colors) is explained, but in this case, it is necessary to read an original in color. Thus, in a case where black-and-white reading is set, the technique according to the third embodiment cannot be implemented, and thus this may be notified to a user to prompt the user to change the setting to color reading. In addition, when a comparison source image is specified based upon color information, in a case where a batch of originals placed in the multi-functional apparatus includes only black-and-white originals, a comparison source image cannot be specified. In such a case, a message indicating that since a difference in the number of colors does not occurs, a comparison source image cannot be specified is presented, and further, a user may be prompted to select the other specification technique.

In addition, a comparison source image may be specified based upon a density value for each pixel in color information. In this case, the CPU 101 sets a predetermined density value and counts the number of pixels that exceed the predetermined density value. Further, the CPU 101 specifies, as a comparison source image, an original having the smallest number of pixels that exceed the predetermined density value. Unlike the method of specifying a comparison source image, based upon the number of colors as described above, this specification technique can be employed for a batch of originals including only originals of black-and-white images.

Figure 2:
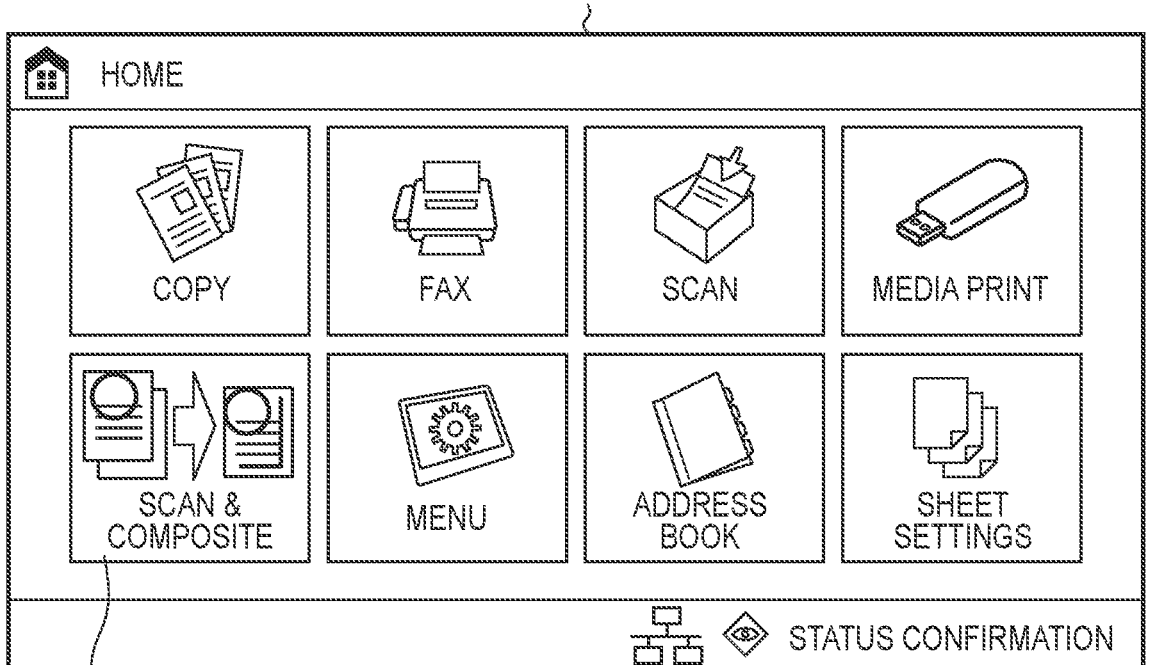
FIG. 2 is a figure illustrating an example of a screen (home screen) displayed on an operation unit, according to an embodiment.

Various different methods of specifying a comparison source image are explained as the first to third embodiments and the modification example described above, but after the application 201 is selected on the home screen 200 of FIG. 2, any of these techniques may be selected by a user input to be used for creating a composite image. For instance, in a case where originals are only black-and-white originals, the technique of the second embodiment described above is not compatible, and thus a user can select the other technique.

Other Embodiments

The present invention can be implemented by processing of supplying a program for implementing one or more functions of the above-described embodiments to a system or apparatus via a network or storage medium, and causing one or more processors in the computer of the system or apparatus to read out and execute the program. The present invention can also be implemented by a circuit (for example, an ASIC) for implementing one or more functions.

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-064276, filed Apr. 5, 2021, which is hereby incorporated by reference herein in its entirety.

What is claimed is:

1. An image forming apparatus comprising:
   reader that reads a document sheet; and
   a processor that causes the image forming apparatus to:
   specify image data of the first document sheet which is firstly read by the reader among image data of the document sheets read by the reader;
   extract a difference by comparing the specified image data and image data of each of other documents sheets included in the read document sheets; and
   create, by composing the extracted difference and the specified image data, a composite image.

2. The image forming apparatus according to claim 1, wherein the processor causes the image forming apparatus to:
   request a user to set only a comparison source document sheet to the reader, and when the reading of the comparison source document sheet ends, request the user to set document sheets other than the comparison source document sheet to the reader; and
   specify image data of the comparison source document sheet as the image data of the first document sheet.

3. The image forming apparatus according to claim 1, further comprising a printer that prints, on a print sheet, the created composite image.

4. The image forming apparatus according to claim 1, further comprising a network interface that transmits, to an external apparatus, image data of the created composite image.

5. An image forming apparatus comprising:
   a reader that reads a document sheet; and
   a processor that causes the image forming apparatus to:
   specify image data of the last document sheet which is lastly read by the reader among image data of the document sheets read by the reader;
   extract a difference by comparing the specified image data and image data of each of other documents sheets included in the read document sheets; and
   create, by composing the extracted difference and the specified image data, a composite image.

6. A method of controlling an image forming apparatus comprising a reader that reads a document sheet, the method comprising:
   specifying image data of the first document sheet which is firstly read by the reader among image data of the document sheets read by the reader;
   extracting a difference by comparing the specified image data and image data of each of other document sheets included in the read document sheets; and
   creating, by composing the extracted difference and the specified image data, a composite image.

7. A non-transitory computer-readable storage medium storing a computer program causing a computer to execute processing in a method of controlling an image forming apparatus comprising a reader that reads a document sheet, the control method comprising:
   specifying image data of the first document sheet which is firstly read by the reader among image data of the document sheets read by the reader;
   extracting a difference by comparing the specified image data and image data of each of other document sheets included in the read document sheets; and
   creating, by composing the extracted difference and the specified image data, a composite image.

* * * * *